(12) United States Patent
Snipes et al.

(10) Patent No.: US 7,213,617 B2
(45) Date of Patent: May 8, 2007

(54) AIRFLOW DIVIDER WITH SHUTOFF

(75) Inventors: Terry Lee Snipes, East Moline, IL (US); Jay Harold Olson, Moline, IL (US); John Wesley Hoy, Coffeyville, KS (US)

(73) Assignee: Deere & Company, Moline, IL (US)

( * ) Notice: Subject to any disclaimer, the term of this patent is extended or adjusted under 35 U.S.C. 154(b) by 4 days.

(21) Appl. No.: 11/179,154

(22) Filed: Jul. 12, 2005

(65) Prior Publication Data

US 2007/0079883 A1  Apr. 12, 2007

(51) Int. Cl.
*F16K 1/00* (2006.01)
(52) U.S. Cl. ..................... 137/883; 406/183
(58) Field of Classification Search ........... 137/872, 137/883; 406/183; 138/94, 94.3
See application file for complete search history.

(56) References Cited

U.S. PATENT DOCUMENTS

| | | | | |
|---|---|---|---|---|
| 154,477 A | * | 8/1874 | Hambitzer | .......... 137/872 |
| 1,116,270 A | | 11/1914 | Harper | |
| 2,673,126 A | * | 3/1954 | Matthews | .......... 406/183 |
| 2,719,681 A | * | 10/1955 | Haberkorn et al. | .......... 406/183 |
| 2,743,742 A | * | 5/1956 | Muff | .......... 138/44 |
| 3,165,124 A | * | 1/1965 | Ausburn et al. | .......... 138/94.3 |
| RE26,238 E | * | 7/1967 | Snell, Jr. | .......... 138/94.3 |
| 3,631,825 A | | 1/1972 | Weiste | .......... 111/11 |
| 4,522,291 A | | 6/1985 | Smick | .......... 193/23 |
| 4,738,774 A | | 4/1988 | Patrick | .......... 209/236 |
| 5,813,762 A | | 9/1998 | Fleischli et al. | .......... 366/337 |
| 5,927,217 A | | 7/1999 | Halford et al. | .......... 111/174 |
| 6,227,770 B1 | | 5/2001 | Poncelet et al. | .......... 406/195 |
| 6,622,747 B2 | * | 9/2003 | Sato et al. | .......... 137/15.09 |
| 6,655,413 B2 | * | 12/2003 | Condon et al. | .......... 138/94.3 |

FOREIGN PATENT DOCUMENTS

CA  2245338  8/1998

* cited by examiner

*Primary Examiner*—John Fox

(57) ABSTRACT

An air divider having a shutoff plate for converting row spacing on a seeding implement. A reversible shutoff plate has a closed position wherein one end of the plate extends through a slot and completely blocks a leg of a Y-shaped output end of the divider. By reversing the shutoff plate, the leg is opened to air and material flow. The shutoff plate is retained in a clip or post adjacent the slot in both the closed and open positions. A seal closes the slot if the shutoff plate is not inserted and permits the shutoff plate option to be selected at any time.

14 Claims, 6 Drawing Sheets

AIRFLOW DIVIDER WITH SHUTOFF

FIELD OF THE INVENTION

The present invention relates generally to seeding implements and, more specifically to air delivery system dividers for such implements.

BACKGROUND OF THE INVENTION

Seeding equipment such as an air drill often utilizes air flow dividers to direct-air and material from one supply hose to two or more delivery hoses. In some drills, two ranks of openers are offset from each other to provide a relatively narrow row spacing. When a wider row spacing is required, the air delivery hoses to one of the ranks of openers are incapacitated by removing the delivery hoses from the dividers, capping the hoses and reinserting the blocked hoses in the dividers for storage. Alternatively, the operator can remove the divider and directly connect the appropriate delivery hose to the supply hose. Other systems include internal valves having selectively positionable plates or flaps.

Operators are demanding air systems that better facilitate row spacing changes. Manually changing hose routings to achieve the desired spacings can be time consuming and inconvenient. Additional parts including caps are required and are subject to loss. Internal plates or flaps generally require a linkage for external control that can easily become inoperable from product buildup and contamination. Some dividers are costly to mold and time-consuming to assemble. A considerable amount of hardware often is necessary to assure an air-tight assembly. Many operators purchase a machine without a conversion feature but later desire to have the feature.

SUMMARY OF THE INVENTION

It is therefore an object of the invention to provide an improved divider for an air delivery system on an implement such as an air seeder. It is a further object to provide such a divider that overcomes most or all of the aforementioned problems.

It is a further object of the invention to provide an improved divider that has a minimal number of parts, is easy to assemble and does not require internal flaps or valves. It is another object to provide such a divider that requires no valve linkages or hose or divider caps and is relatively unaffected by product buildup and contamination.

It is yet another object of the present invention to provide an improved air flow divider for facilitating conversion of row spacing on a seeding implement. It is another object to provide such a divider that may easily be converted to receive a delivery hose cutoff feature even if the feature is not originally supplied with the implement.

An air divider includes common divider halves with integral interlocking features to reduce molding costs, hardware, and assembly time. The interlocking features facilitate the use of common divider halves on the top and bottom of the assembly. Raised ribs in the air divider permit outlet hoses to simply be slid into place but prevent the hose from pulling out from between the divider halves.

Slots incorporated into both halves of the air divider receive a shutoff plate. A removable seal prevents air leakage and can be easily displaced by the shutoff plate to thereby allow conversion of an air divider not originally purchased with a shutoff feature. A reversible shutoff plate has a closed position wherein one end extends through the slot and completely blocks a leg of a Y-shaped output end of the divider. By reversing the shutoff plate, the leg is opened to air and material flow. The shutoff plate is retained in a post or clip adjacent the slot in both the closed and open positions. A finned post is supported in a cavity defined in the assembled divider halves projects from the body member, and the shutoff plate is apertured for convenient receipt over the finned post. The post is a separate piece and is molded from wear-resistant plastic for good retention characteristics. The post can easily withstand multiple shutoff plate changes during seeding seasons. Shutoff plate changes can be made with one hand and without need for tools.

These and other objects, features and advantages of the present invention will become apparent upon reading the description below in view of the drawings.

DESCRIPTION OF THE PREFERRED EMBODIMENT

Figure 1:
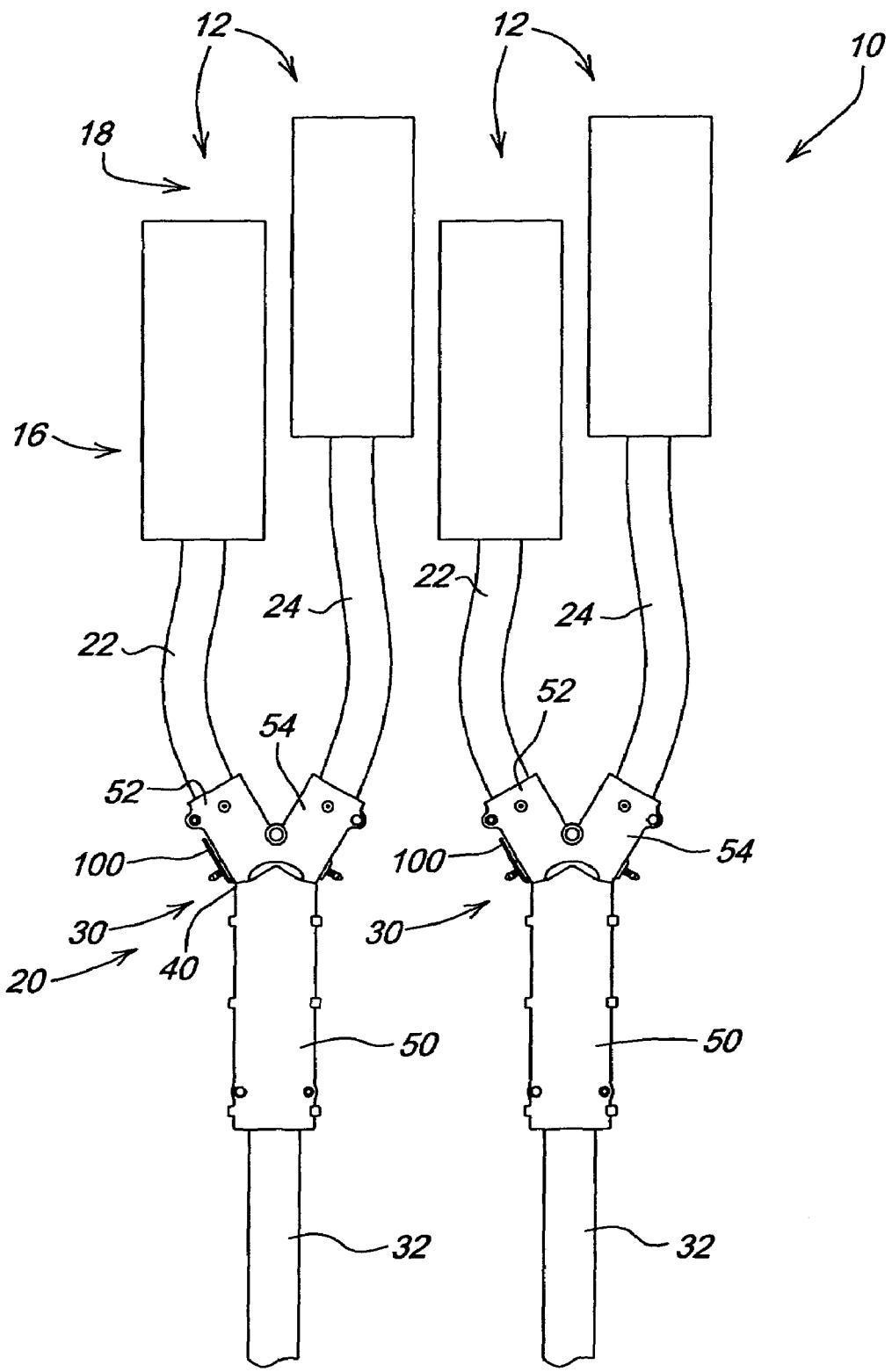
FIG. 1 is a schematic representation of a portion of a seeding implement having two ranks of openers and an air divider system.
Figure 2:
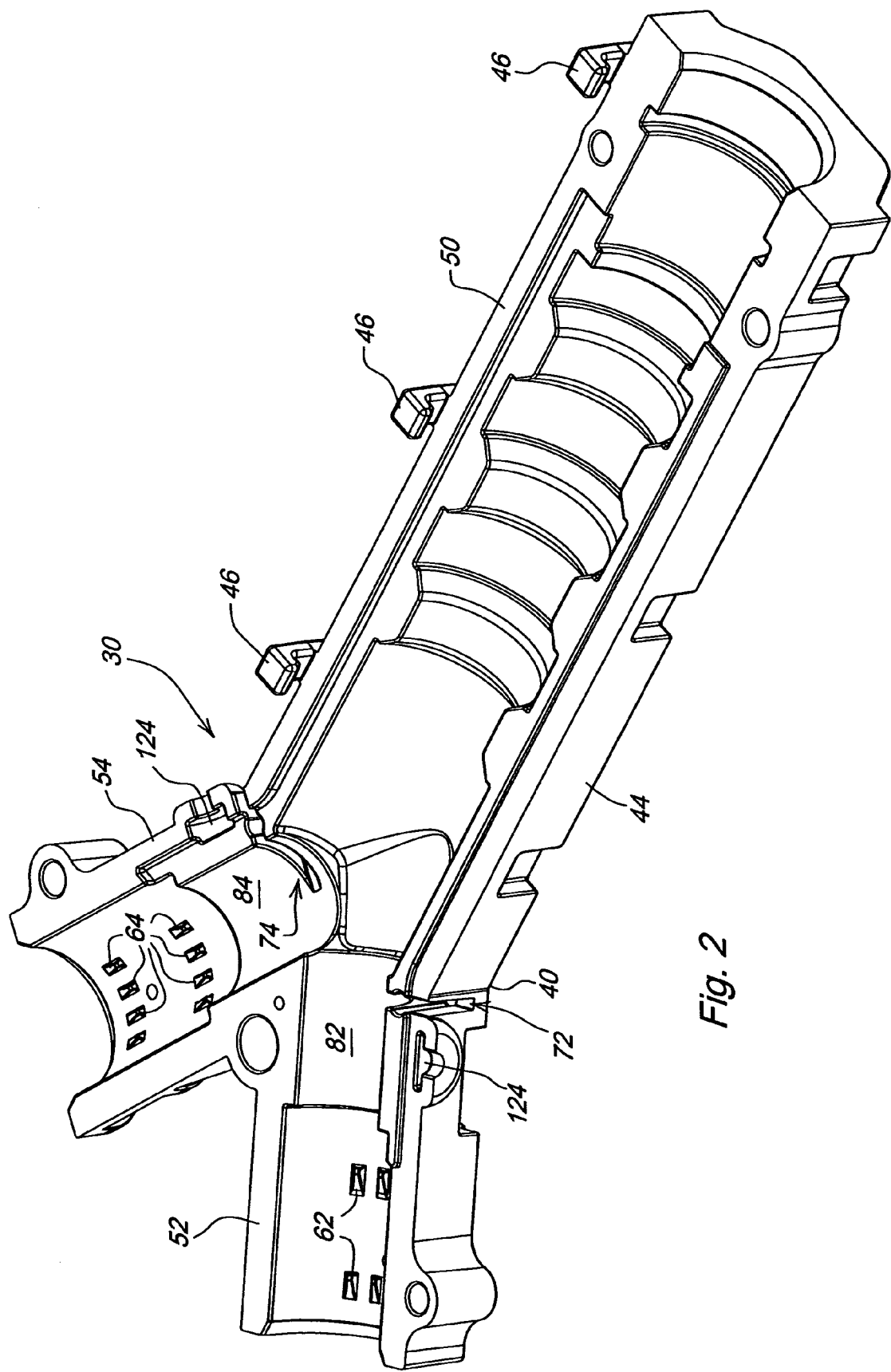
FIG. 2 is a view of the bottom half of the air divider.
Figure 3:
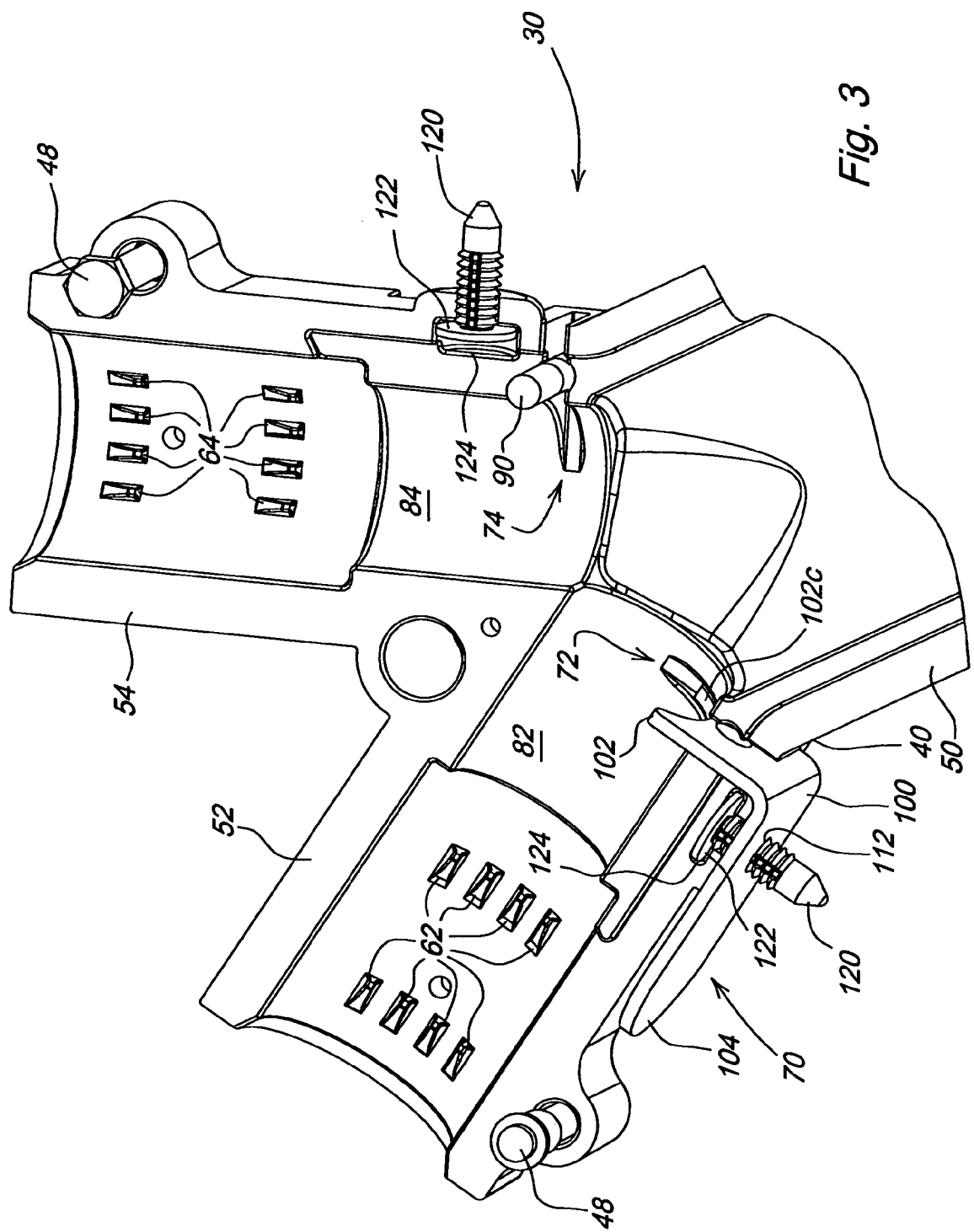
FIG. 3 is an enlarged perspective view of a portion of the air divider showing the cutoff plate in the open position.
Figure 4:
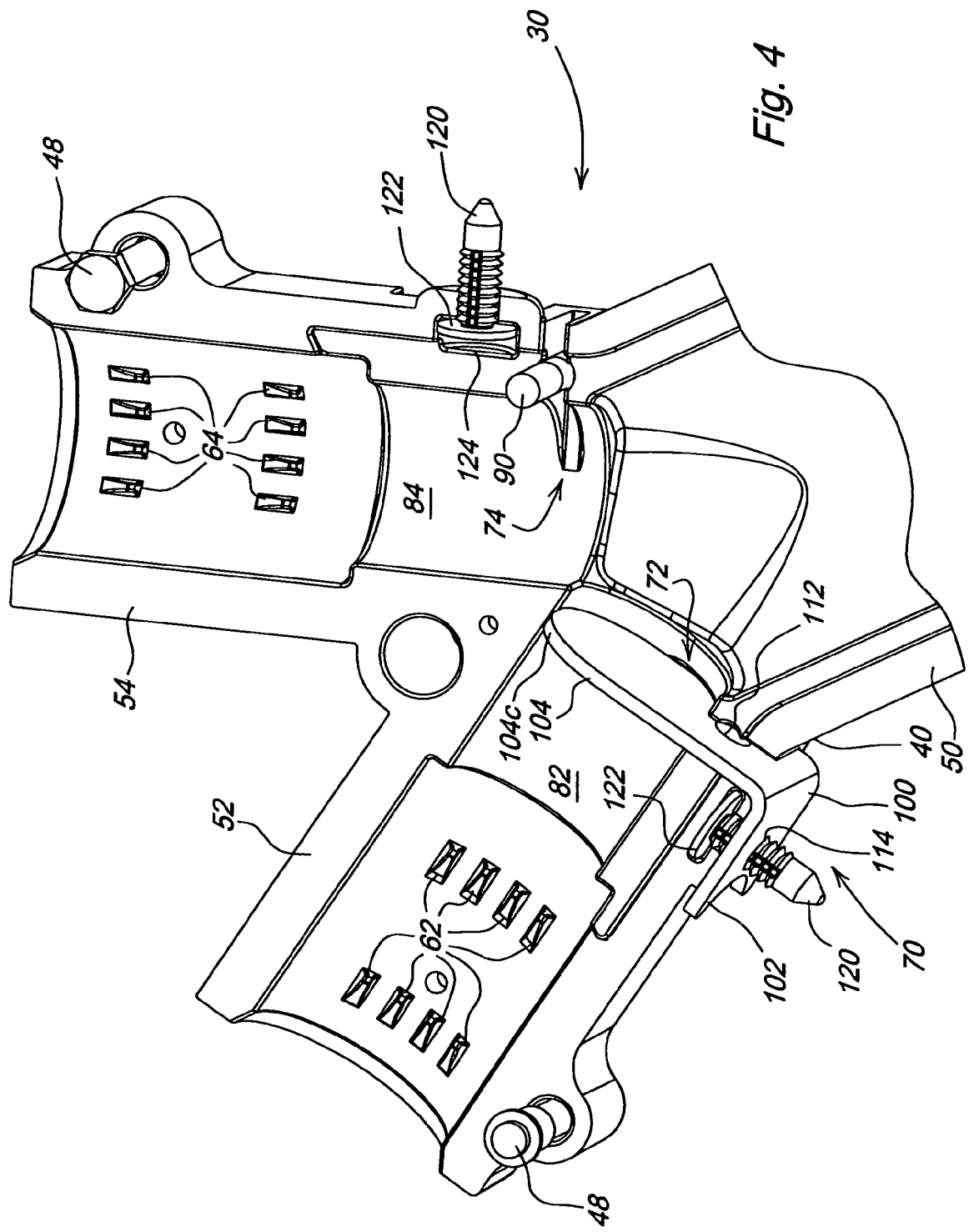
FIG. 4 is a view similar to FIG. 3 but showing the cutoff plate in the closed position.
Figure 5:
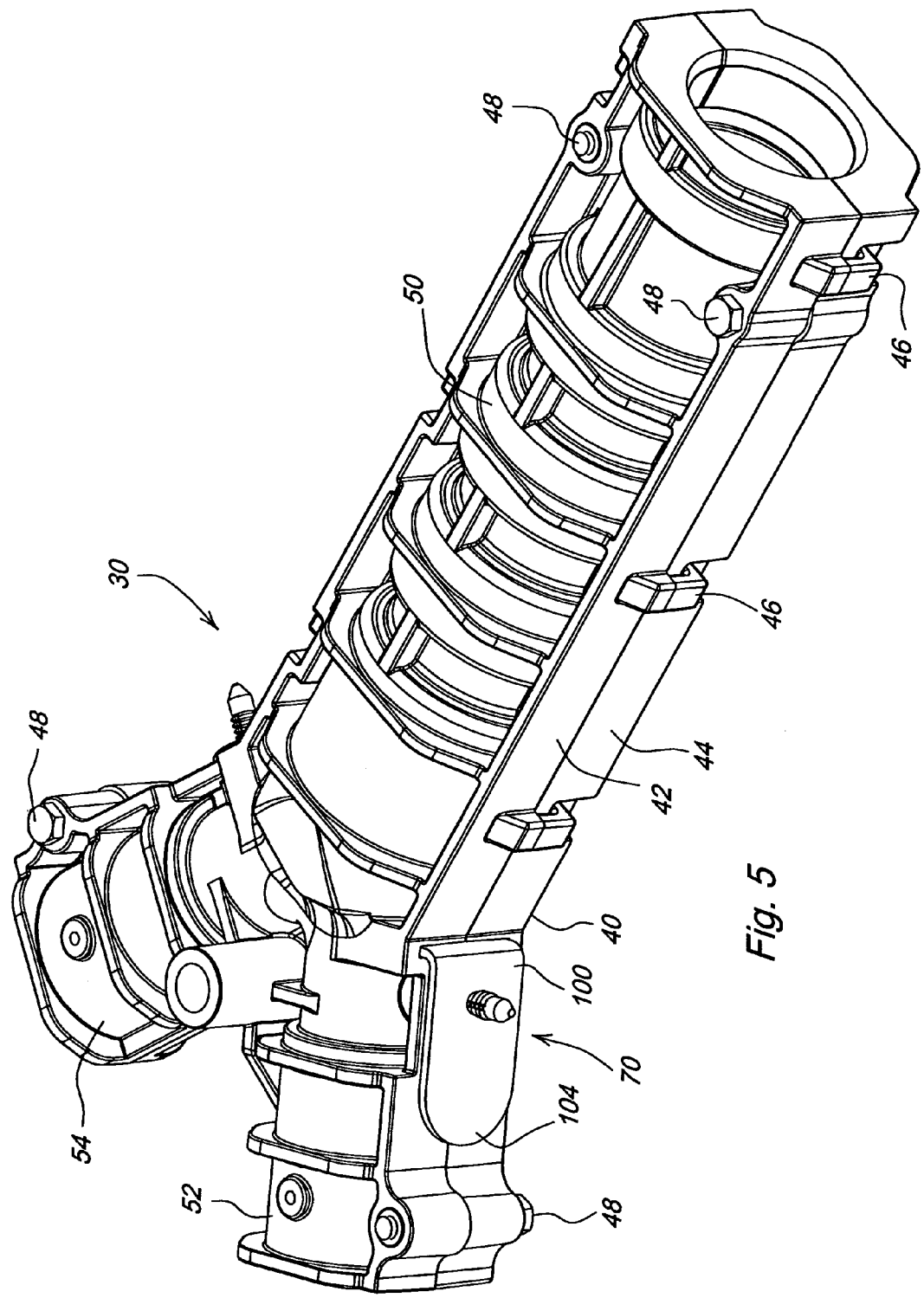
FIG. 5 is a perspective view of the air divider.
Figure 6:
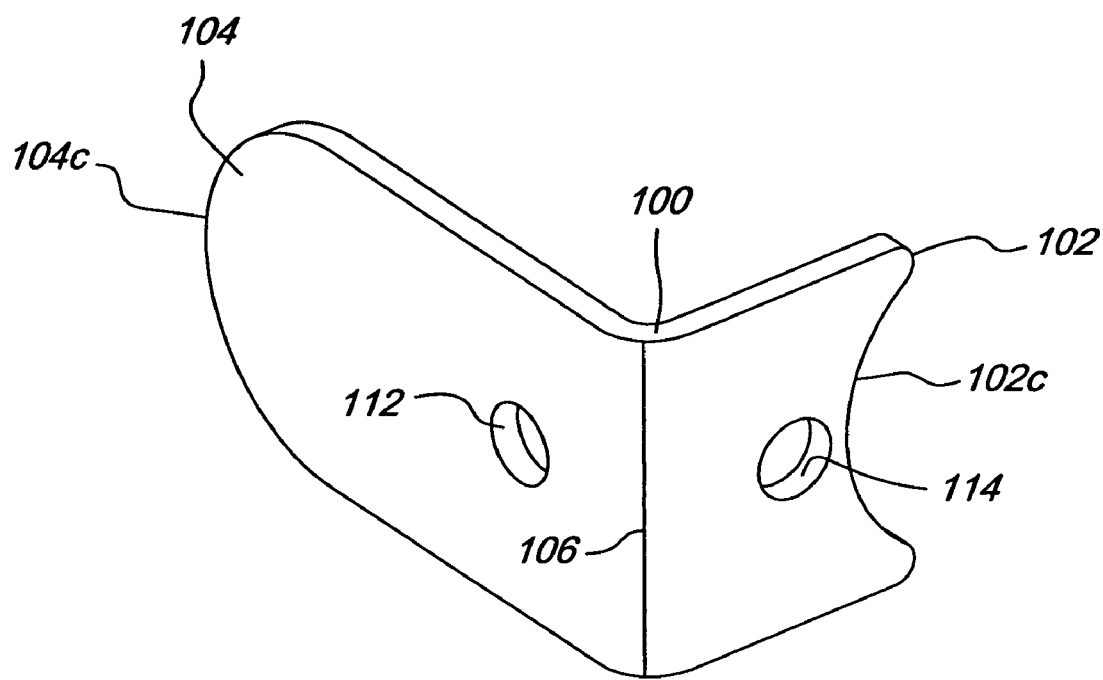
FIG. 6 is an enlarged perspective view of the cutoff plate.

Referring now to FIG. 1, therein is shown a portion of an implement such as an air drill 10 having trailing tools 12 for depositing material such as seeds or fertilizer in the soil. As shown, the tools 12 include first and second ranks 16 and 18 of furrow openers for applying the material in narrowly spaced rows. An air delivery system 20 includes delivery hoses 22 and 24 connected to outputs of an air divider indicated generally at 30. A supply hose 32 is connected to an input of the divider 30 and to a source of pressurized air (not shown) for delivering material to the divider 30. The divider 30 splits the material and air into separate streams for delivery to the tools 12 via hoses 22 and 24.

If a more widely spaced row pattern or a particular non-uniformly spaced row pattern is desired, flow to specific tools 12 is blocked. For example, for a uniform wide row spacing the flow to either the first rank 16 or to the second rank 18 can be interrupted. If adjacent rows are to be skipped to accommodate an implement wheel spacing, both delivery hoses 22 and 24 from a single divider can be blocked.

Referring to FIGS. 2–6, an embodiment of the divider 30 is shown for selective blocking and unblocking of preselected delivery hoses 22 and 24. The divider 30 includes a body 40 having first and second portions or top and bottom body halves 42 and 44. The halves 42 and 44 are generally identical and include snap fasteners 46 for securing the halves together to form the body 40. Additional screws or fasteners 48 extend through apertures in the body to tightly secure the halves 42 and 44 together and seal the mating surfaces.

As shown, the divider 30 is Y-shaped and includes an input leg or end 50 receiving the supply hose 32 and diverging output legs or ends 52 and 54 receiving the delivery hoses 22 and 24, respectively. Raised ribs 62 and 64 permit the hoses to be slipped into position into the legs 52 and 54 and prevent the hoses from pulling out.

The divider 30 includes selective shutoff structure indicated generally at 70 for preventing material from flowing to one of the tools to thereby change row spacing of the material deposited in the ground. The divider includes slotted areas 72 and 74 closely adjacent the upstream ends of the legs 52 and 54 adjacent the downstream end of the input leg 50. The slotted areas 72 and 74 define slots having a width generally corresponding to the diameter of the inner bores 82 and 84 of the legs 52 and 54 and terminating within the bores. A foam seal 90 (FIGS. 3 and 4) of circular cross section and length approximately equal to the width of the slots is initially located in each of the slotted areas 72 and 74. The seal as shown extends generally tangentially to the respective bore 82 or 84. Initially the divider 30 may be provided to the customer with seals 90 in the slotted areas so that the divider functions as a conventional splitter. If the customer later decides to add the shutoff feature described below, a reversible shutoff plate 100 can be inserted in the corresponding slotted area to displace the seal 90 and provide sealing for the slotted area.

The reversible shutoff plate or angle 100 (FIG. 6) includes a first or open end portion 102 and an opposed second or closed end portion 104. The end portions 102 and 104 are connected by a central 90 degree angled portion 106 having slots or apertures 112 and 114 offset equal distances from the bend in the angled portion 106. Quick attach ratcheting or fin type fastener posts 120 include headed portions 122 captured in conforming cavities or receiving slots 124 molded into the body halves 42 and 44 adjacent and downstream of the slotted areas 72 and 74. The apertures 112 and 114 have a diameter slightly smaller than the diameter of the fins of the fastener posts 120 to firmly secure the shutoff plate 100 to the divider 30 when either the first end portion 102 or the second end portion 104 is inserted in the slotted area.

As shown, the posts 120 are push pin or finned point types of connectors commonly utilized in automotive applications. One half of the receiving slot 124 is molded into each of the two mating halves 42 and 44. When assembled, the halves 42 and 44 trap the headed portions 122 in the slots 124. The exposed finned posts 120 projecting from the body receive the desired aperture 112 or 114. The fins deflect as the aperture moves downwardly during engagement of the shutoff plate, and the slot 72 or 74 prevents rotation of the shutoff plate about the axis of the post 120. The post 120 facilitates mounting and removal of the plate 100 with a single hand and without the need for tools. To change the selected shutoff plate position, the plate 100 is pulled outwardly in a direction parallel to the slot and to the axis of the post 120. Since each post 120 is separate from the body of the divider, the post does not have to be molded with the body and can have different properties for better wear and retention characteristics for multiple shutoff plate changes during seeding seasons. However, various other types of quick attach clips or fasteners may also be used in place of the posts 120 to secure the shutoff plate 100, including clips or other fasteners molded directly into the body similar to those shown at 46.

To provide flow through both of the legs 52 and 54 to the tools 12, the shutoff plate 100 is positioned with the aperture 112 over the post 120 so that the open end portion 102 inserts into the slotted area 72. The open end portion 102 has an arc-shaped cutout 102*c* conforming to the inner surface of the bore 82 so that air and material flow through the leg 52 are substantially unimpeded. To change delivery to the tools 12, for example, when the operator desires to increase row spacing by cutting off material flow to one of the ranks 16 or 18, the closed end 104 is inserted into the slotted area with the aperture 114 received over the post 120. The closed end 104 includes an arc-shaped edge 104*c* conforming to the shape of the bore 82 opposite the slotted area 72 to generally close the upstream end of the leg 52 and prevent air and material flow through the leg 52 into the delivery hose 22. The location of the slotted areas 72 and 74 closely adjacent each other and the downstream area of the input end 50 limits the dead space adjacent a closed end 104 of the shutoff plate in the blocking position to eliminate material build-up in the slotted area.

Having described the preferred embodiment, it will become apparent that various modifications can be made without departing from the scope of the invention as defined in the accompanying claims. For example, although the shutoff structure is described for a pair of legs, the structure could also be used for a single leg or for any number of legs.

The invention claimed is:

1. A divider for a seeding implement, the divider comprising:
    a Y-shaped member having a base end connector for receiving a material supply hose and split legs opposite the base end for receiving material delivery hoses, the legs having an internal bore portion;
    the Y-shaped member including a slotted portion adjacent one of the legs;
    a reversible shutoff plate having first and second ends, the ends selectively insertable into the slot, wherein the first end has an open area generally conforming to the internal bore portion to facilitate movement of material through the leg when the first end is inserted in the slot, and wherein the second end has a blocking portion generally closing the internal bore portion and preventing material from flowing through the bore portion when the second end is inserted in the slot;
    a clip member located adjacent the slot, the clip member securing the plate to the Y-shaped member when either the first end or the second end is inserted in the slot; and
    wherein the Y-shaped member comprises generally identical half sections with first and second half leg portions, and two clip members are secured between the half section leg portions.

2. The divider set forth in claim 1 wherein the shutoff plate comprises an angle, the first end includes a circular cut out portion conforming to the bore and providing generally unhampered flow through the bore portion, and the second end includes a rounded projection conforming to the internal bore portion and generally closing the bore portion.

3. The divider set forth in claim 1 wherein the plate comprises an angle having slotted portions adjacent the first and second ends for receiving the clip member.

4. The divider set forth in claim 3 wherein the clip member comprises a finned post projecting from the Y-shaped member and the plate includes aperture structure received over the post member.

5. The divider as set forth in claim 1 wherein the shutoff plate includes an apertured area located between the first and second ends for securing the shutoff plate to the Y-shaped member.

6. The divider set forth in claim 1 wherein the Y-shaped member includes a sealing member covering the slot to seal the slot in the absence of insertion of the shutoff plate.

7. The divider set forth in claim 6 wherein the sealing member comprises a foam seal located in the slot.

8. The divider as set forth in claim 1 wherein the clip member comprises a boltless member providing a quick attachment and removal of the shutoff plate.

9. A divider for a seeding implement, the divider comprising:
- a body member having a base end connector for receiving a material supply hose and a leg having an output end opposite the base end for receiving a material delivery hose, the leg having an internal bore portion;
- the body member including a slotted portion adjacent the leg;
- a shutoff plate having a projecting end and positionable in a blocking position within the slotted portion, wherein in the blocking position the projecting end blocks movement of material through the leg;
- wherein the body member includes a securing member for attaching the shutoff plate in the blocking position;
- wherein the shutoff plate is positionable in a non-blocking position and the securing member secures the shutoff plate to the body member in the non-blocking position; and
- wherein the shutoff plate comprises an angle having first and second ends extending generally at a right angle to each other, wherein the first end is positionable within the slot to define the non-blocking position and the second end is positionable in the slot to define the blocking position.

10. The divider set forth in claim 9 wherein the shutoff member comprises a reversible member having apertures, and wherein the securing member receives at least one of the apertures in both the blocking and the non-blocking positions.

11. The divider set forth in claim 9 including a seal supported in the slotted portion and providing an air-tight seal in the absence of the shutoff plate within the slot.

12. A divider for a seeding implement, the divider comprising:
- a body member having a base end connector for receiving a material supply hose and a leg having an output end opposite the base end for receiving a material delivery hose, the leg having an internal bore portion;
- the body member including a slotted portion adjacent the leg;
- a shutoff plate having a projecting end and positionable in a blocking position within the slotted portion, wherein in the blocking position the projecting end blocks movement of material through the leg;
- wherein the body member includes a securing member for attaching the shutoff plate in the blocking position;
- a seal supported in the slotted portion and providing an air-tight seal in the absence of the shutoff plate within the slot; and
- wherein the seal comprises a knock-out seal, the shutoff plate displacing the seal when the plate is inserted in the slotted portion.

13. A divider for a seeding implement having transversely spaced tools for depositing rows of material in the ground, the divider comprising:
- a divider member having a base end connector for receiving a material supply hose and split legs opposite the base end for receiving material delivery hoses for delivering material to the tools, the legs having an internal bore portion;
- the divider member including a plate-receiving portion adjacent one of the legs;
- a reversible shutoff plate having first and second ends selectively insertable into and removable from the plate-receiving portion, wherein the first end has a flow facilitating area providing generally free movement of material through the leg when the first end is inserted in the plate-receiving portion and wherein the second end has a blocking portion generally closing the internal bore portion and preventing material from flowing through the bore portion to one of the tools to thereby change row spacing of the material deposited in the ground when the second end is inserted in the plate-receiving portion;
- wherein the divider member includes a seal located at the plate-receiving portion and generally providing an air-tight seal for the plate-receiving portion before the shutoff plate is inserted into the plate-receiving portion; and
- wherein the shutoff plate comprises an angle having an open portion defining the first end and a solid portion defining the second end, and further comprising a central connecting portion adapted for boltless quick coupling to the divider member when either the first end or the second end is inserted in the plate-receiving portion.

14. The divider as set forth in claim 13 wherein the first and second ends have arc-shaped edges conforming to the shape of the internal bore.

* * * * *